Jan. 10, 1950 W. H. BASELT 2,494,280
BRAKE
Filed Sept. 29, 1945 2 Sheets-Sheet 1
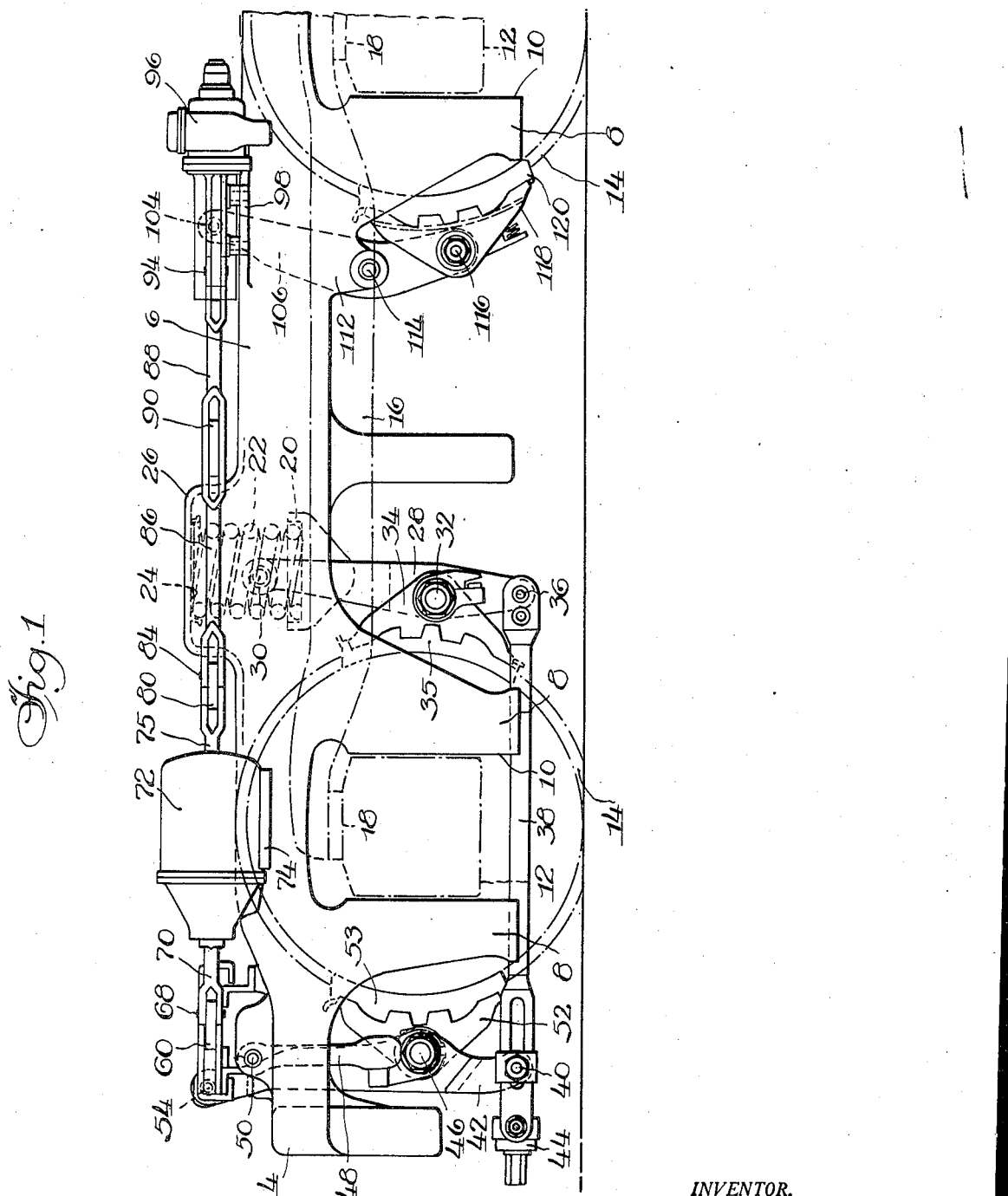
INVENTOR.
Walter H. Baselt
BY
Atty.

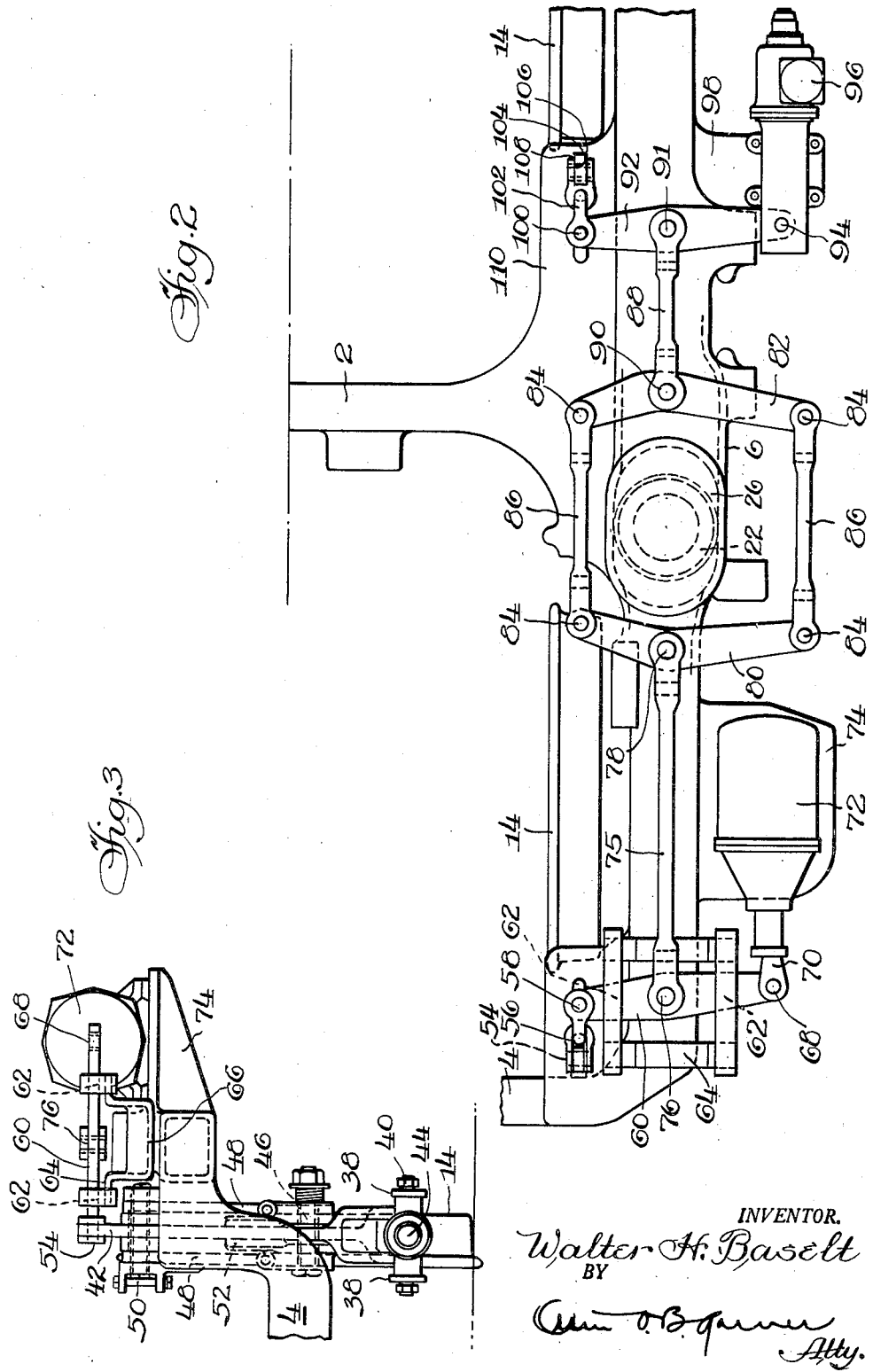

Patented Jan. 10, 1950

2,494,280

UNITED STATES PATENT OFFICE 2,494,280

BRAKE

Walter H. Baselt, Flossmoor, Ill., assignor to American Steel Foundries, Chicago, Ill., a corporation of New Jersey Application September 29, 1945, Serial No. 619,286

12 Claims. (Cl. 188—46)

My invention relates to brake mechanism or brake rigging for use on railway car trucks and more particularly to a unit cylinder arrangement of the clasp brake type.

An object of my invention is to provide a unit cylinder clasp brake for six-wheel railway car trucks.

Another object of my invention is to provide a unit cylinder clasp brake for high speed passenger car trucks.

Still another object is to provide such a brake arrangement wherein the power means is carried on the truck frame.

A different object of my invention is to design a unit cylinder clasp brake arrangement for a six-wheel truck wherein power means are supported adjacent each of the four corners of the truck frame, each power means being operable to actuate its associated brake equipment independent of the other power means, and wherein each power means actuates all the brake equipment associated with one wheel and a portion of the brake equipment associated with an adjacent wheel.

A further object of my invention is to design a brake arrangement of the type described wherein the brake rigging is arranged in a manner meeting all clearance conditions and service conditions.

My invention comprehends a brake arrangement including a lever equalizing system formed and arranged to circumvent portions of the truck prohibiting the employment of a single lever or a plurality of levers arranged in lineal formation.

With these and other objects in view, the invention may consist of certain novel features of construction and operation as will be more fully described and particularly pointed out in the specification, drawings and claims appended hereto.

In the drawings:

Figure 1 is a fragmentary side elevation of one end of a passenger car truck construction having a brake arrangement embodying the invention applied thereto;

Figure 2 is a fragmentary top plan view of the truck and brake construction illustrated in Figure 1; and Figure 3 is a transverse fragmentary end elevation of the truck and brake construction illustrated in Figure 1, the view being taken from the left as shown in said figures.

In the drawings, certain details are omitted from various views when better shown in other views.

Describing the structure in detail, the truck frame of conventional design comprises a transom 2 and the end rail 4 integrally formed with the side member 6, said side member having the usual pedestals 8, 8 forming therebetween journal openings 10, 10 for association in usual manner with journal boxes 12, 12, said truck frame being supported from the journal ends of the wheel and axle assemblies having wheels indicated at 14, 14 through equalizers 16 having a formation now in conventional use for purposes well known to those skilled in the art. The equalizers are supported as at 18, 18 from the journal boxes 12, 12 which are mounted for movement within the openings 10, 10 provided between depending pedestals 8, 8 of the frame. The truck frame is supported from the equalizers 16, each equalizer being provided with a spring seat member 20 secured thereto and supporting a spring 22 extending upwardly and seated as at 24 against the top wall of a spring pocket 26 formed in the side member 6 of the frame and desirable to insure the proper length of the spring for affording sufficient flexibility thereof for good riding qualities of the car body (not shown) supported from the truck frame.

In the conventional truck arrangement described, the truck is adapted for high speed passenger trains and, for this reason, the passenger car bodies are disposed closely above the trucks in order that as low a center of gravity as possible be maintained. It will be apparent that the upwardly projecting portion of the side member 6 of the frame, defining the spring pocket 26 therein, affords little space for clearance from the car body, and as the brake levers are usually movably positioned between the car body and trucks for actuating the brake shoes into engagement with the wheels inboard the trucks, my novel brake arrangement comprises a novel lever or yoke arrangement for circumventing the spring pocket 26 to meet this clearance condition and to insure proper functioning of the brake rigging.

As the brake mechanism for the truck is identical at each of the four corners of the truck, description of the brake equipment for only one corner of the truck will be described. The brake mechanism comprises the dead truck lever 28 inwardly of the end wheel and pivotally supported at its upper end from the side member 6 as at 30 and pivotally supporting intermediate its ends as at 32 the brake head 34 with the associated brake shoe 35 disposed for cooperative engagement with the adjacent wheel.

The lever 28 is pivotally and adjustably connected at its lower end as at 36 to the paired inner and outer straps 38, 38, the opposite ends of the straps being pivotally connected as at 40 to the lower end of the live truck lever 42, the connection at 40 being made adjustable by the manual slack adjuster 44. The lever 42 is pivotally supported at a point intermediate its ends as at 46 by the paired hangers 48, 48, said hangers being pivotally hung at their upper ends from the truck frame as at 50. A brake head 52 with its associated brake shoe 53 is supported also at the lower ends of the hangers 48, 48 and at the pivotal point 46 for engagement with the opposite periphery of the before-mentioned wheel. The upper end of the lever 42 is pivotally connected as at 54 to the clevis means 56, the opposite end of said clevis means having a pivotal connection as at 58 to the inner end of the horizontal live cylinder lever 60 supported on wear plates at spaced points 62, 62 from the U-shaped bracket 64 which is carried as at 66 on the side member 6. The opposite end of the cylinder lever 60 has a pivotal connection as at 68 to the piston rod 70 associated with the power means or brake cylinder 72. The cylinder 72 is carried on the bracket 74 integrally formed as a part of the side frame and secured thereto by suitable securing means.

A pull rod 75 is pivotally connected as at 76 to the cylinder lever 60 intermediate the ends thereof, the opposite end of said pull rod having a pivotal connection as at 78 to a novel equalizing or floating linkage comprising a pair of substantially parallel horizontal equalizer or floating members 80, 82 disposed on opposite sides of the upwardly projecting portion of the side member 6 forming the spring pocket 26 therein and having offset central portions spaced from the spring pocket 26 to afford ample clearance during actuation of the brake rigging as hereinafter described. Each of said members 80, 82 extends transversely of the side member 6 and has a pivotal connection as at 84, 84 at their inboard and outboard ends to one of a pair of pull rods 86, 86 extending longitudinally of the side member 2 at opposite sides of the spring pocket 26, the members 80, 82 and pull rods 86, 86 forming a yoke or parallelogram linkage completely surrounding the upwardly projecting portion of the truck side member 6 defining the spring pocket therein. The pull rod 75 is pivotally connected at one end thereof as at 78 intermediate the ends of the member 80 and a pull rod 88 has a pivotal connection as at 90 to the member 82 and at the opposite end thereof as at 91 to a dead horizontal auxiliary lever 92 intermediate the ends thereof, the outboard end of said lever 92 being pivotally and adjustably connected as at 94 to the automatic slack adjuster 96 secured to a bracket 98 integral with the side member 6.

The inboard end of the lever 92 is pivotally connected at 100 to the clevis means 102, the opposite end of said clevis means having a pivotal connection as at 104 to the upper end of the dead truck lever 106 which projects through a slot 108 formed in the gusset 110 at the juncture of the transom 2 with the side member 6. The dead truck lever 106 is fulcrumed from a bracket 112 on the side member 6 at a point 114 intermediate the ends of said lever and pivotally supports from its lower end as at 116 the brake head 118 and its associated brake shoe 120 arranged for cooperative engagement with the adjacent wheel.

It will be apparent from the foregoing description that the brake rigging with the exception of the brake cylinder and automatic slack adjuster is disposed below the uppermost limits of the truck side member 2 and that ample clearance is thus provided between the car body and the truck, the cylinder and automatic slack adjuster being positioned at the outboard side of the truck on the brackets afforded by the side member 6 in a manner preventing interference with the superposed car body.

In operation, actuation of the power means 72 causes the piston rod 70 to move to the left (Figure 2) to thereby rotate the cylinder lever 60 in a clockwise direction about its pivotal point 68 at its lower end and through the clevis 56 causes rotation of the live truck lever 42 in a clockwise direction about the pivot 40 until the brake shoe 53 engages the periphery of the adjacent wheel. Further actuation causes the live truck lever 42 to rotate in a clockwise direction about the pivot 46 intermediate its ends to thereby move the straps 38, 38 to the left, causing rotation of the dead truck lever 28 about the pivot 30 at its upper end until the brake shoe 35 carried thereby engages the opposite periphery of said wheel.

Actuation of the power means also causes the cylinder lever 60 to rotate in a clockwise direction about the pivot 58 at its inboard end to move the pull rod 75 to the left and thereby causing movement of the equalizing members 80, 82 to the left through the pivotal connection 78 of member 80 to the rod 75 and their pivotal connections 84, 84 to the pull rods 86, 86, sufficient clearance being had at opposite sides of the spring pocket 26 of the side frame 2 to permit this movement of the equalizing arrangement. As the pull rod 88 is pivotally connected as at 90 to the member 82, the former will also be moved to the left and through its pivotal connection 91 to the lever 92 will cause the lever 92 to rotate in a counterclockwise direction about its pivot point 94 at its outboard end, and through the clevis connection 102 at its inboard end, cause movement of the dead truck lever 106 in a counterclockwise direction about the pivot point 114 intermediate its ends until the brake shoe 120, carried thereby, is engaged with the periphery of the adjacent wheel. Reverse movement of the power means causes the various parts to move in the reverse of the directions just specified, thus releasing the brake mechanism. It will be apparent that operation of the various parts, while described in successive steps, takes place simultaneously whereby all of the brake shoes will be applied at substantially the same time by the brake equipment at each of the four corners of the truck by simultaneous actuation of the power means or cylinders.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a six-wheel railway car truck, a framework, wheel and axle assemblies, power means mounted adjacent the four corners of said framework, and clasp brake means for each wheel, each of said power means being operable to actuate the brake means at opposite sides of one wheel and at one side of an adjacent wheel, said brake means comprising interconnected live and dead truck levers at opposite sides of said first-mentioned wheel, a live cylinder lever having its inner end connected to said live truck lever and its outer end connected to said power means, a dead auxiliary lever connected at opposite ends thereof to said framework and to the dead truck lever associated with the second-mentioned wheel, yoke means operatively connecting said live cylinder lever and said dead auxiliary lever, said means comprising a pair of spaced members having inboard and outboard ends, pull rods connecting the inboard and outboard ends of said members, a pull rod having a connection to said cylinder lever and to one of said members intermediate the ends thereof, and a pull rod having a connection to said dead auxiliary lever and to the other of said members intermediate the ends thereof.

2. In a railway car truck, a truck frame including a side member, spaced wheel and axle assemblies, interconnected live and dead truck levers supported on opposite sides of a wheel of one of said assemblies and a dead truck lever supported on a side of a wheel of another assembly, power means on said side member, and connections between said power means and the live and dead truck levers of said first-mentioned wheel and the dead truck lever of the second-mentioned wheel, said connections including a parallelogram linkage overlying said side member and comprising a floating element at each operating end of the linkage, said floating elements extending transversely of the side member, pull rods intermediate the ends of said linkage disposed adjacent the opposite sides of said side member and interconnecting the corresponding ends of the floating elements, means connecting one of said floating elements intermediate the ends thereof with said live truck lever and said power means, and means connecting the other of said floating elements intermediate the ends thereof with said dead truck lever of said second-mentioned wheel.

3. In a six-wheel railway car truck, a truck frame comprising integrally formed side members, end rails and transoms, wheel and axle assemblies, brake rigging for each end wheel and an intermediate wheel, said brake rigging comprising interconnected live and dead truck levers supported on opposite sides of an end wheel, a dead truck lever supported adjacent one side of an intermediate wheel, power means mounted on a side member for actuation of said levers, and connections between said power means and said levers, said connections comprising a plurality of interconnected floating members forming a yoke, one of said floating members having a connection to said power means and said live truck lever, and a dead auxiliary lever connected intermediate the ends thereof to another of said floating members and having a connection at opposite ends thereof to a slack adjuster mounted on a side member and to the dead truck lever of the intermediate wheel.

4. In a six-wheel railway car truck, a truck frame, wheel and axle assemblies, brake rigging for each end wheel and an intermediate wheel, said brake rigging comprising interconnected live and dead truck levers supported on opposite sides of an end wheel, a dead truck lever supported adjacent one side of an intermediate wheel, power means mounted on a side of said frame for actuation of said levers, and connections between said power means and said levers, said connections including a parallelogram linkage comprising a plurality of interconnected members, a live cylinder lever connected to one of said members and having a connection to said power means and to said live truck lever, and a dead auxiliary lever connected intermediate the ends thereof to another of said members and having a connection at opposite ends thereof to a slack adjuster mounted on the side of said frame and to the dead truck lever of the intermediate wheel.

5. In a six-wheel railway car truck, a truck frame comprising integrally formed side members, end rails and transoms, power means mounted thereon adjacent the four corners, wheel and axle assemblies, interconnected live and dead truck levers supported on opposite sides of each end wheel, dead truck levers supported on opposite sides of each intermediate wheel, and connections between each of said power means and the live and dead truck levers of one end wheel and one of the dead truck levers of an intermediate wheel, said connections comprising a parallelogram linkage including a pair of interconnected members constituting opposite ends of said linkage, and a live cylinder lever connected at opposite ends thereof to said power means and to the live truck lever of an end wheel and having a connection intermediate the ends thereof through said parallelogram linkage to a dead auxiliary lever having a connection to the dead truck lever of an intermediate wheel.

6. In a six-wheel railway car truck, a truck frame comprising a side member, wheel and axle assemblies, brake rigging for each end wheel and an intermediate wheel, said brake rigging comprising interconnected live and dead truck levers supported on opposite sides of an end wheel, a dead truck lever supported adjacent one side of an intermediate wheel, power means mounted on said side member for actuation of said levers, and connections between said power means and said levers, said connections comprising a live cylinder lever connected to said power means and said live truck lever, a dead auxiliary lever connected at opposite ends to said side member and to the dead truck lever associated with the intermediate wheel, and means connecting said live cylinder lever and said dead auxiliary lever comprising a pair of substantially parallel spaced equalizing members, parallel means connecting the corresponding ends of said equalizing members, a connection between said cylinder lever and one of said equalizing members, and a connection between said dead auxiliary lever and the other of said equalizing members.

7. In a six-wheel railway car truck, a framework, wheel and axle assemblies, power means mounted adjacent the four corners of said framework, and clasp brake means for each wheel, each of said power means being operable to actuate the brake means at opposite sides of one wheel and at one side of an adjacent wheel, said brake means comprising interconnected live and dead truck levers at opposite sides of said first-mentioned wheel and a dead truck lever at one side of the adjacent wheel, a live cylinder lever having its inner end connected to said live truck lever and its outer end connected to said power means, a dead auxiliary lever fulcrumed from said framework and connected to the dead truck lever associated with said second-mentioned wheel, and a parallelogram linkage between said live cylinder lever and said dead auxiliary lever and connected at one end thereof to said cylinder lever intermediate the ends thereof and connected at its other end to said dead auxiliary lever, said two last-named points of connection being disposed substantially in alignment with each other longitudinally of said truck.

8. In a six-wheel railway car truck, a framework, wheel and axle assemblies, power means mounted adjacent the four corners of said framework, and clasp brake means for each wheel, each of said power means being operable to actuate the brake means at opposite sides of one wheel and at one side of an adjacent wheel, said brake means comprising interconnected live and dead truck levers at opposite sides of said first-mentioned wheel, a dead truck lever at one side of the adjacent wheel, a live cylinder lever having its inner end connected to said live truck lever and its outer end connected to said power means, a slack adjuster mounted on said framework, a dead auxiliary lever fulcrumed from said slack adjuster at one end and connected at its other end to the dead truck lever associated with the second-mentioned wheel, and means including a parallelogram linkage interposed between and operatively connecting said live cylinder lever and said dead auxiliary lever intermediate the ends thereof.

9. In a six-wheel railway car truck, a framework, wheel and axle assemblies, power means mounted adjacent the four corners of said framework, and clasp brake means for each wheel, each of said power means being operable to actuate the brake means at opposite sides of one wheel and at one side of an adjacent wheel, said brake means comprising interconnected live and dead truck levers at opposite sides of said first-mentioned wheel, a live cylinder lever connected at opposite ends thereof to said power means and said live truck lever, and a connection between said live cylinder lever intermediate the ends thereof to the brake means of said last-mentioned wheel, said connection comprising a pair of floating members having inboard and outboard ends, and pull rods connecting the inboard and outboard ends of said members, said members and pull rods forming a parallelogram linkage.

10. In a six-wheel railway car truck, a framework, wheel and axle assemblies, power means mounted adjacent the four corners of said framework, and clasp brake means for each wheel, each of said power means being operable to actuate the brake means at opposite sides of one wheel and at one side of an adjacent wheel, said brake means comprising interconnected live and dead truck levers at opposite sides of said first-mentioned wheel, a live cylinder lever connecting said power means and said live truck lever, and a floating linkage connecting said cylinder lever to brake means associated with said second-mentioned wheel, said linkage comprising a pair of floating members having inboard and outboard ends, and pull rods connecting the inboard and outboard ends of said last-mentioned levers.

11. In a brake rigging for a six-wheel railway car truck, a truck framework, wheel and axle assemblies, interconnected live and dead truck levers supported on opposite sides of one wheel, a dead truck lever supported at one side of an adjacent wheel, power means mounted on said framework, a live cylinder lever adapted to be actuated by said power means and operatively connected to said live truck lever, a dead auxiliary lever fulcrumed from said framework and operatively connected to said second-mentioned dead truck lever, and a connection between said live cylinder lever and said dead auxiliary lever, said connection including yoke means.

12. In a brake rigging for a railway car truck, a truck framework, wheel and axle assemblies, power means mounted on said framework adjacent the four corners thereof, clasp brakes for each wheel, a live cylinder lever, a dead lever, one of said levers having a connection to braking means associated with one wheel, and the other of said levers having a connection to operate a portion of the braking means associated with an adjacent wheel, and a floating parallelogram linkage spaced from said framework and connecting said levers.

WALTER H. BASELT.

REFERENCES CITED

The following references are of record in the file of this patent:

UNITED STATES PATENTS

| Number | Name | Date |
|---|---|---|
| 555,527 | Peckham | Mar. 3, 1896 |
| 795,348 | Fowler | July 25, 1905 |
| 2,133,531 | Blomberg | Oct. 18, 1938 |
| 2,148,363 | Aurien | Feb. 21, 1939 |